United States Patent [19]
Meckstroth et al.

[11] Patent Number: 5,439,420
[45] Date of Patent: Aug. 8, 1995

[54] ACCESSORY DRIVE SYSTEM FOR AN AUTOMOTIVE ENGINE

[75] Inventors: Richard J. Meckstroth, Northville; Gerard S. Toth, Belleville, both of Mich.

[73] Assignee: Ford Motor Company, Dearborn, Mich.

[21] Appl. No.: 223,250

[22] Filed: Apr. 4, 1994

[51] Int. Cl.6 .............................................. F16H 7/08
[52] U.S. Cl. .................................................... 474/133
[58] Field of Search ................ 474/101, 111, 113–117, 474/133–138

[56] References Cited

U.S. PATENT DOCUMENTS

| | | |
|---|---|---|
| 1,701,820 | 2/1929 | Morse . |
| 3,136,170 | 6/1964 | Murray . |
| 4,498,889 | 2/1985 | Stevens et al. ........................ 474/133 |
| 4,883,446 | 11/1989 | Mitchell et al. ....................... 474/133 |
| 5,131,889 | 7/1992 | Meckstroth et al. . |
| 5,256,113 | 10/1993 | Bushman et al. . |
| 5,277,666 | 1/1994 | Kumm ................................. 474/133 |

FOREIGN PATENT DOCUMENTS 279415  11/1951  France .

*Primary Examiner*—Michael Powell Buiz
*Attorney, Agent, or Firm*—Jerome R. Drouillard; Roger L. May

[57] ABSTRACT

An accessory drive system for an automotive engine includes a drive pulley attached to an output shaft of the engine and a flexible drivebelt for connecting the drive pulley with driven pulleys. A tensioner maintains the drivebelt in contact with each of the drive and driven pulleys. The tensioner includes an arm which is rotatably mounted to the engine which has a wheel for contacting the drivebelt. The wheel is urged into contact with the drivebelt by the arm, with the tensioner further including a governor for controlling rotational motion of the arm with the arm being able to rotate freely in the direction in which tension of the drivebelt is increased, with the governor resisting motion of the arm in the direction in which tension in the drivebelt is decreased.

16 Claims, 4 Drawing Sheets

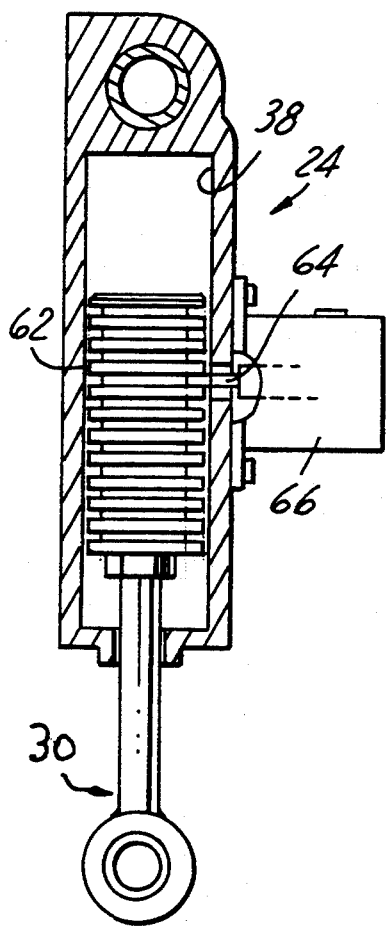
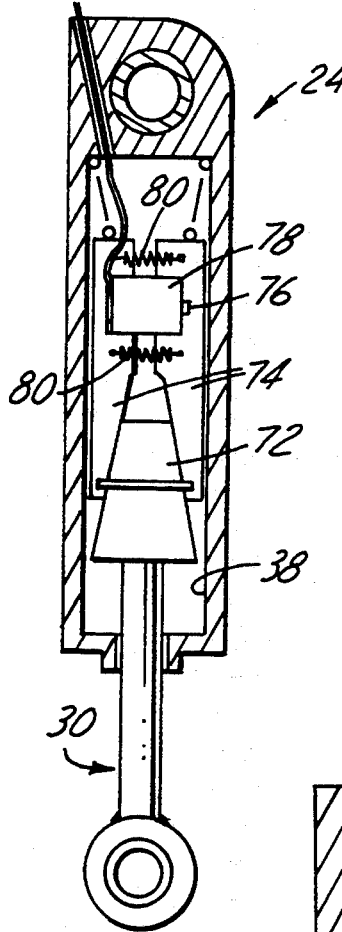
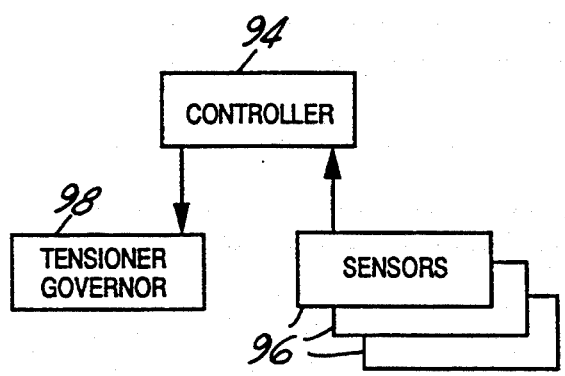
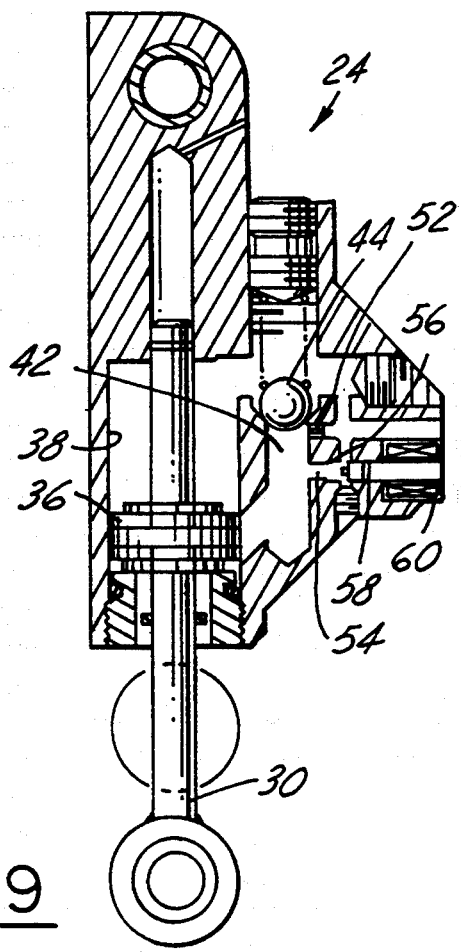
FIG.6
FIG.7
FIG.8
FIG.9

ACCESSORY DRIVE SYSTEM FOR AN AUTOMOTIVE ENGINE

BACKGROUND OF THE INVENTION

The present invention relates to a belt-driven automotive engine accessory drive system and means for tensioning such a system. Drive systems for the front end accessories of automotive engines typically include a belt having a tensioning device for maintaining the belt in contact with all the pulleys of the system, including the drive pulley, which is usually attached to the crankshaft of the engine, as well as with a plurality of driven pulleys, with at lease one driven pulley attached to each rotating accessory. Such accessories frequently include an alternator, a power steering pump, an air conditioning compressor, a secondary air pump for emission controls, as well as other types of rotating devices.

Conventional tensioners utilize elastic force provided by, for example, a flat wire spring for maintaining a tensioning pulley in contact with the drive belt. Such a pulley is shown as item No. 34 in FIG. 1 of the present application. Although damped tensioners have been used to some extent in automotive front end accessory drive systems, such tensioners typically are symmetrical in their damping characteristics. In other words, the motion of the tensioner is damped in the direction tending to increase the tension of the belt, as well as in the direction tending to decrease the tension in the belt. Unfortunately, if the tensioner is set up with a fairly low damping rate so as to allow the tensioner wheel to be compliantly in contact with the bet in a direction tending to tighten the belt, the tensioner will be allowed to pull back in a direction allowing the belt to loosen in the event that he following series of events occurs within the acessory drive system.

FIG. 10 illustrates a problem with conventional tensioners which is solved by a tensioner according to the present invention. Operation of a front end accessory drive system with a corrective tensioner according to the present invention is shown in FIG. 11. Both plots illustrate the rotational speed or angular velocity of an engine's alternator, idler pulley, and crankshaft pulley. The rotational speed of the idler pulley is a direct indicator of the speed of the drivebelt because it is assumed for the purpose of this discussion that minimal slip occurs between the idler pulley and the drivebelt; this is a good assumption because the rotating inertia of the idler pulley is relatively slight as compared with the rotational inertia of the other components of the engine's front end accessory drive system, particularly the alternator. As shown in both plots, crankshaft rpm decreases at a very high rate in the situation being considered. It has been determined that during wide open throttle transmission upshifts at lower gear speeds, such as the upshift from first to second gear with an automatic transmission and an engine speed of, for example 4500 rpm, the crankshaft may decelerate at a rate approaching 20,000 rpm per second. These high deceleration rates cause the front end accessory drivebelt to slip on one or more pulleys, particularly the crankshaft pulley, thereby giving an objectionable squealing noise which will be audible to the driver of the vehicle. The squealing noise produced by the loose drivebelt slipping on the crank pulley is caused by an overrunning effect of the alternator. FIGS. 10 and 11 show rotational speed data produced during tests in which an instrumented engine was rapidly decelerated from a high rate of speed. FIG. 10 illustrates the behavior of a prior art system; FIG. 11 illustrates a system according to the present invention. As shown in FIG. 10, alternator speed tails off to zero at about 300 msec. after the crankshaft stops. Similarly, the idler rpm and drivebelt speed tail off to zero at about 200 milliseconds following the stopping of the crankshaft. This occurs because once the crankshaft stops, the high rotational inertia of the alternator causes it to remain rotating and causes the alternator to pull the tensioner in a direction so as to loosen the belt. In turn, this causes a "bubble" of belt to extend from the alternator to the crankshaft pulley, and as a result the drivebelt slips on the crankshaft pulley. The resultant squeal may be very audible. In contrast with the operation according to the conventional tensioner at FIG. 10, FIG. 11 shows the results of the use of a tensioner and control system according to the present invention. In essence, the tensioner has a governor for controlling the rotational motion of the tensioner arm such that the tensioner's arm will be freely able to rotate in the direction in which the tension in the drivebelt is increased, while movement of the arm in the direction in which tension in the drivebelt is decreased, is resisted. Because the tensioner cannot move readily in the direction in which the tension in the drivebelt is decreased, the tension within the belt is maintained and, as a result, the deceleration rates of the drivebelt, the alternator and the crankshaft converge. This is shown graphically in FIG. 11. Note that the three plots for alternator, idler and crankshaft all converge at a about 1100 msec. This means effectively that the alternator is no longer permitted to pull the tensioner in a direction tending to decrease the tension in the belt, and as a result, the alternator is decelerated in close congruence with the crankshaft's deceleration. This has the beneficial effect of preventing squeal of the drivebelt at the crank pulley, because with the tension maintained at a proper level in the drivebelt, the belt will not slip at the crankshaft pulley.

SUMMARY OF THE INVENTION

An accessory drive system for an automotive engine includes a drive pulley attached to an output shaft of the engine, a flexible drivebelt for connecting the drive pulley with a plurality of driven pulleys, with one driven pulley located on each of a plurality of driven devices, and a tensioner for maintaining the drivebelt in contact with each of the drive and driven pulleys. The tensioner comprises an arm which is rotatably mounted to the engine and which has a wheel for contacting the drivebelt, with the wheel being urged into contact with the drivebelt by the arm, and with the tensioner further comprising a governor for controlling rotation of motion of the arm such that the arm will be freely able to rotate in the direction in which the tension in the drivebelt is increased, with the governor resisting the motion of the arm in the direction in which tension in the drivebelt is decreased. The governor may comprise a hydraulic strut interposed between the tensioner arm and a mounting surface fixed to the engine adjacent the tensioner, such that linear motion of the strut accompanies rotational motion of the arm. The hydraulic strut preferably has a connecting rod portion which is able to move freely in the direction in which tension in the drivebelt is increased, while resisting movement in the direction in which tension in the drivebelt is decreased. The hydraulic strut preferably comprises a piston reciprocably mounted within a cylinder mounted upon the connecting rod, with the connecting rod having a free end attached to the tensioner arm such that the piston slides within the cylinder as the tensioner arm rotates, with the motion of the piston being controlled by hydraulic fluid contained within the cylinder such that the motion of the piston in the direction which allows the tensioner to rotate in the direction in which the tension of the drivebelt is increased is substantially uninhibited, but motion of the piston in the direction in which the tensioner allows the tension within the drivebelt to decrease is restrained by hydrostatic force within the cylinder. Hydrostatic force is maintained within the cylinder by causing fluid leaving the cylinder under compressive force generated by the piston to flow through a restrictive orifice when the piston is moving in the direction in which tension within the drivebelt is decreased, with the strut having a parallel flow channel which is valved so as to allow fluid to flow freely from the cylinder when the piston is moving in the direction in which tension within the drivebelt is increased. The hydrostatic force within the cylinder may be maintained selectively by providing either an orifice and a bypass channel for the fluid to flow through when the piston is moving in the direction in which tension in the drivebelt is decreased, with flow through the bypass channel being controlled by a solenoid valve operated by an electronic controller such that when the solenoid valve is open, motion of the piston will be unrestrained in both directions. In general, an electronic controller may be used to operate the solenoid valve such that rotational motion of the arm is restricted during periods of operation characterized by either rapid engine deceleration or when engine speed exceeds a predetermined value, or both. As an alternative embodiment, a strut according to the present invention may comprise a slidable geared rack which is lockable in a plurality of linear positions by a solenoid actuated plunger engageable with the gear teeth of the rack, with the plunger and solenoid being operated by an electronic controller.

According to yet another aspect of the present invention, a method for controlling the tension of a flexible drivebelt in an accessory drive system of an automotive engine comprises the steps of sensing at least one engine operating parameter indicative of engine operation in a mode tending to decrease tension in the drivebelt below a threshold at which traction of the belt is adequate to avoid slipping of the belt, and upon sensing a value of at least one operating parameter corresponding to a value of the drivebelt tension below the threshold, directing a tensioner associated with the accessory drive system to change from a mode in which the tensioner compliantly tensions the drivebelt to a mode in which the tensioner non-compliantly tensions the drivebelt so as to prevent the tension from decreasing. It is an advantage of the present invention that a system having a system according to the present invention will resist and prevent unwanted changes in drivebelt tension which occur or accompany rapid changes in engine speed.

BRIEF DESCRIPTION OF THE DRAWINGS

FIG. 6 is an illustration of a geared rack type of strut according to the present invention.

FIG. 7 is an example of a friction brake strut according to another aspect of the present invention.

FIG. 8 is a block diagram of a control system for a tensioner according to the present invention.

FIG. 9 is an illustration of a strut according to the resent invention having a solenoid operated control valve.

DETAILED DESCRIPTION OF THE PREFERRED EMBODIMENTS

Figure 1:
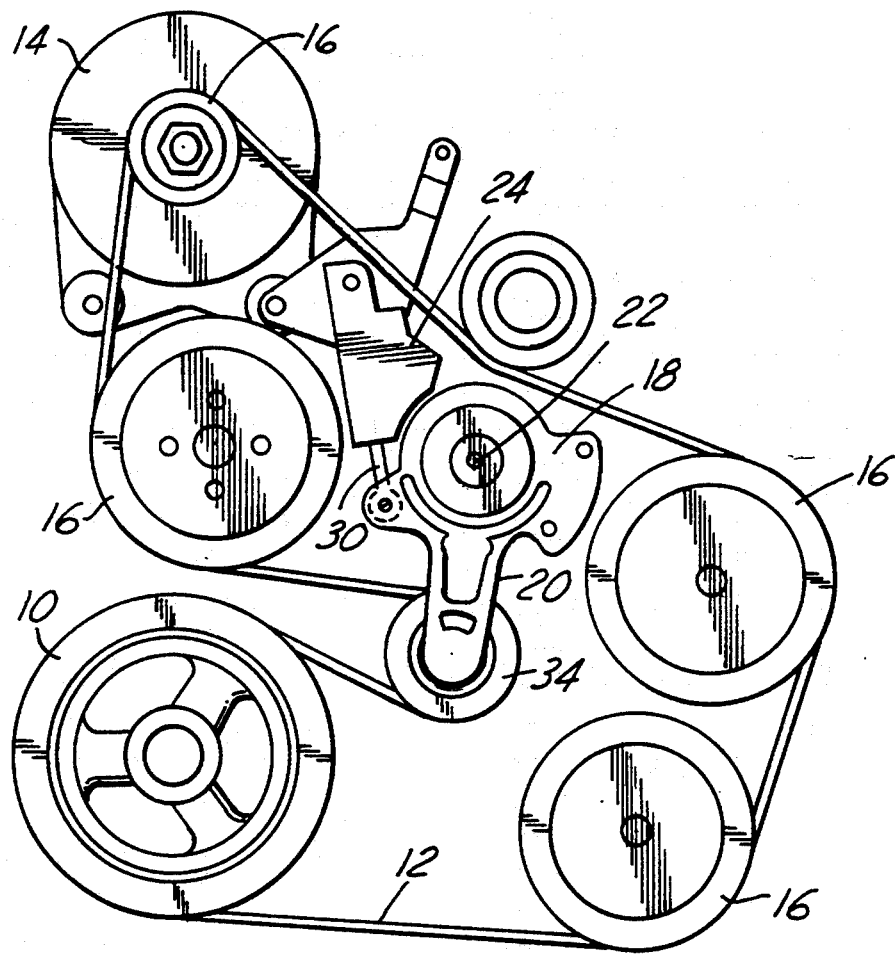
FIG. 1 is a system illustration of a front end accessory drive system according to the present invention.

FIG. 1 illustrates an automotive type internal combustion engine front end accessory drive system according to the present invention. Flexible drivebelt 12, which is driven by pulley 10 attached to the engine's crankshaft, powers a series of rotating accessories which may include an alternator, a power steering pump, an air conditioning compressor, a water pump, an air pump to operate an emission control system, and other rotating accessories known to those skilled in the art. Particularly included in the present combination of accessories is alternator 14 which, due to its high rotational inertia, would normally create a problem which is solved by a tensioner according to the present invention. Tensioner 18, as modified according to the present invention, maintains drivebelt 12 in contact with each of driven pulleys 16, as well as drive pulley 10, so that squealing or other objectionable noises will not occur. This is accomplished by maintaining proper tension in belt 12 at all times.

Figure 2:
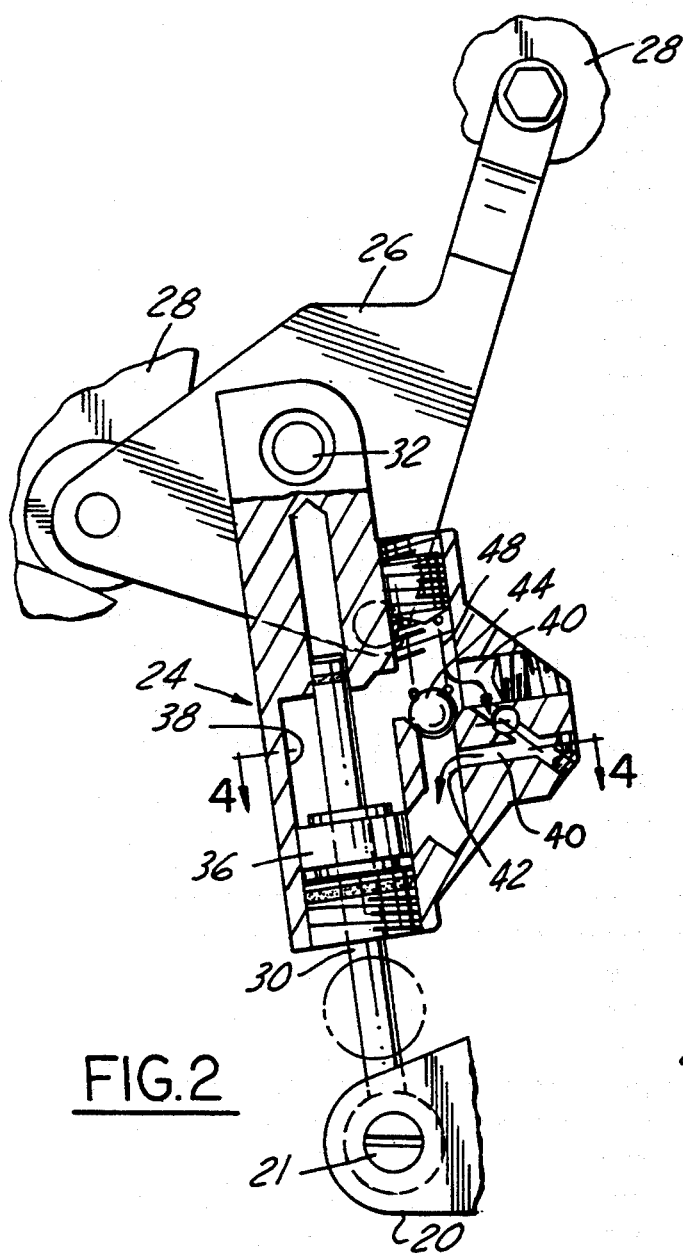
FIG. 2 is a view of a hydraulic strut according to one aspect of the present invention.
Figure 3:
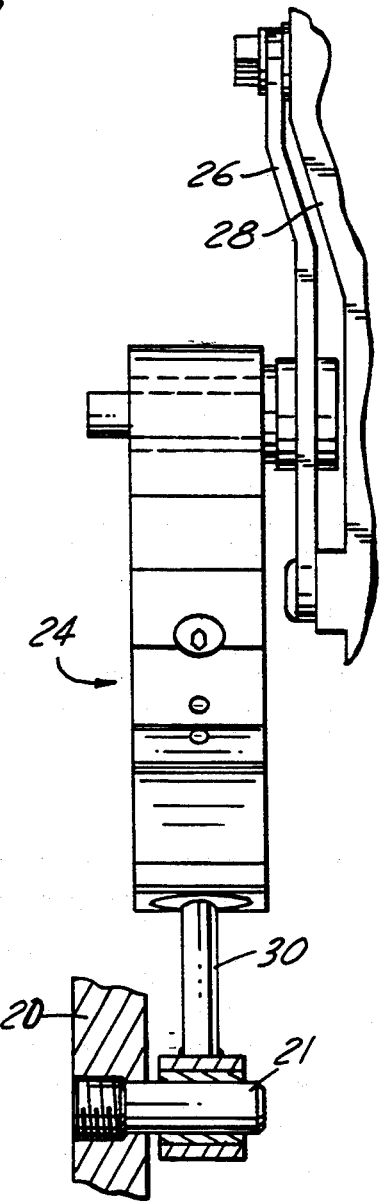
FIG. 3 is a side elevation of the strut illustrated in FIG. 2.
Figure 4:
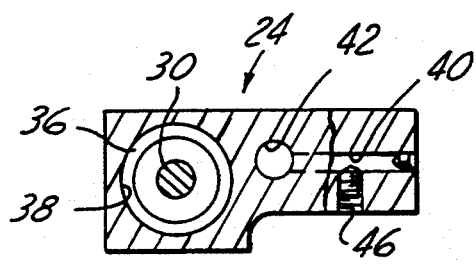
FIG. 4 is a section partially broken away of the strut according to FIG. 2, taken along the line 4—4 of FIG. 2.
Figure 10:
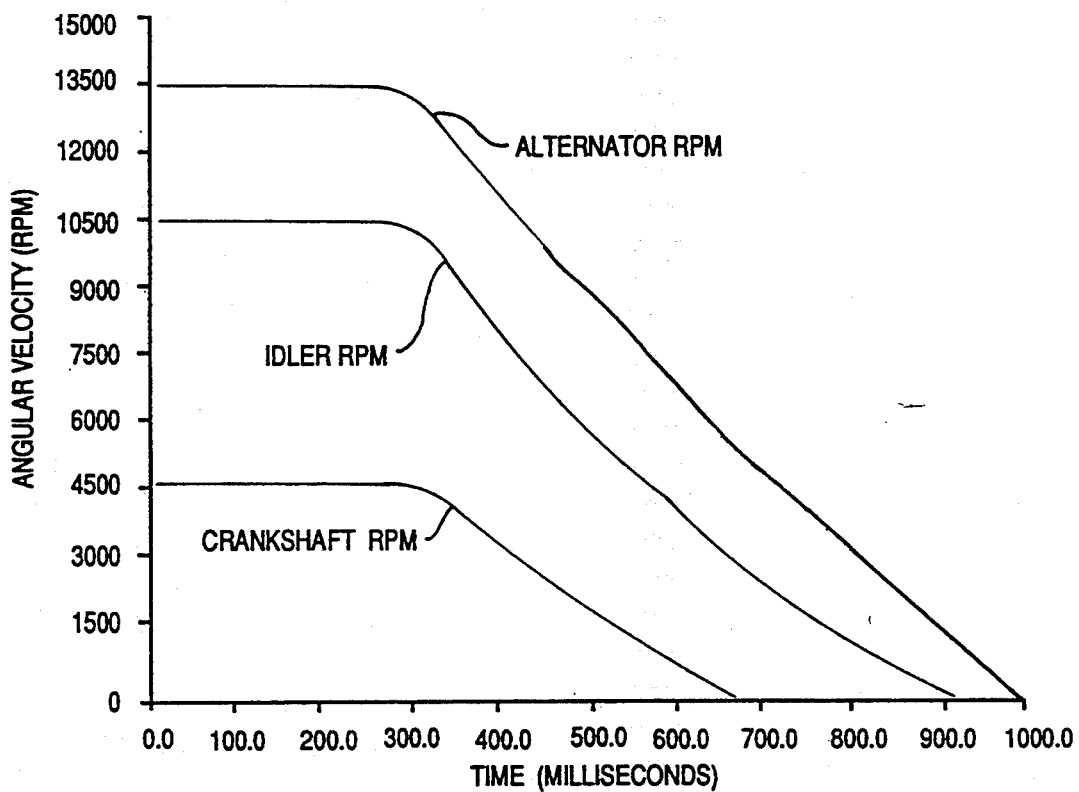
FIGS. 10 and 11 illustrate the operation of a front end accessory drive without and with a system according to the present invention, respectively.
Figure 11:
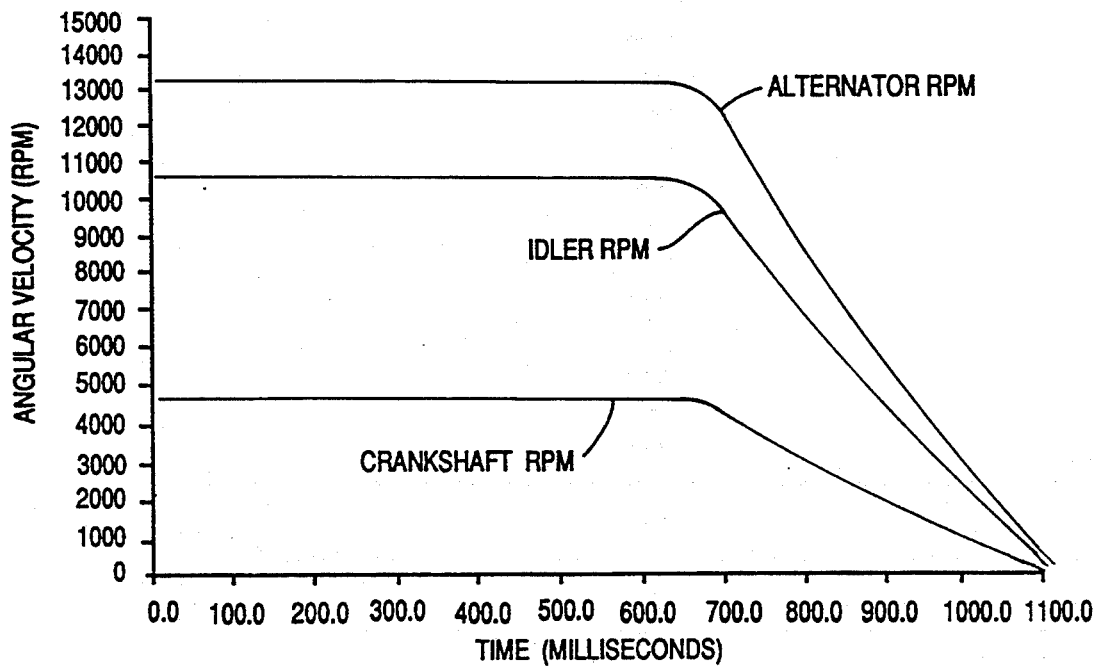

FIGS. 2, 3, and 4 illustrate an example of a hydraulic strut type of tensioner governor according to the present invention. As shown in FIGS. 2 and 3, strut 24 is attached to bracket 26 which is rigidly mounted to front surface 28 of the engine. Strut 24 is attached to bracket 26 by means of mounting pin 32. The strut has connecting rod 30 having a free end which is pivotally mounted to tensioner arm 20 at pivot point 21. Hydraulic strut 24 also has piston 36 mounted upon connecting rod 30. Piston 36 slides within cylinder 38 while following the rotational motion of arm 20. As seen from FIGS. 1 and 2, motion of arm 20 in the direction in which tension in drivebelt 12 is decreased is accompanied by upward motion toward the mounting end of strut 24 at point 32. Conversely, motion of the strut in the direction tending to increase the tension on drivebelt 12 is in a direction for piston 36 to move out of cylinder 38. Motion of connecting rod 30 and piston 36 in a direction in which tension in the drivebelt is increased, i.e., motion in which piston 36 is moving in the direction in which connecting rod 30 extends to a greater extent from cylinder 38, is substantially uninhibited because hydraulic oil within the cylinder is free to flow through low pressure passage 42, and after unseating check ball 44 from its seat, can freely flow to the upper side of cylinder 38 after having moved past check ball 44. Because check ball 44 is maintained on its seat by spring 48, which can be relatively light, movement of piston 36 and connecting rod 30 in a downward direction so as to accompany increasing tension in belt 12 is relatively uninhibited. If, on the other hand, the engine slows down precipitously so that alternator 14 would tend to pull arm 20 in the direction of decreased tension in belt 12, piston 36 would be forced in an upward direction, and the flow of hydraulic fluid from cylinder 38 would be through port 50 in the top of cylinder 38 and past metering screw 46 (FIG. 4). High pressure passage 40, which allows fluid to flow from the cylinder and past metering screw 46 is substantially occluded by metering screw 46, or alternatively, by another type of orifice suggested by this disclosure. Accordingly, motion of piston 36 is essentially restricted by the hydrostatic force built up within cylinder 38. In essence, the motion of the piston may be hydrostatically locked, depending upon the degree of restriction imposed by metering screw 46. In this fashion, tensioner 24 will prevent tension on drivebelt 12 from being released due to the overrunning condition caused by alternator 14 or by any other overrunning accessory, for that matter, thereby preventing drivebelt 12 from slipping on any of the drive or driven pulleys.

FIG. 6 shows a second embodiment of strut 24 according to the present invention, in which a slidable geared rack 62 is lockable in a plurality of linear positions by solenoid actuated plunger 64, which is engageable with geared teeth of rack 62, with the plunger and solenoid being operated by an electronic controller according to FIG. 8. As shown in FIG. 8, controller 94 receives a variety of information signals from a plurality of sensors 96, which may comprise speed sensors indicating the rotational speed of the engine or any other rotating component on the vehicle, or engine acceleration sensors, or other types of sensors known to those skilled in the art of engine control and suggested by this disclosure. In the event that controller 94 senses engine speed above a threshold, for example, or any other operating parameter indicative of engine operation in a mode tending to decrease tension in drivebelt 12 below a threshold at which traction of the belt is adequate to avoid slipping of the belt, controller 94 will direct tensioner 98 to change from a mode in which the tensioner compliantly tensions the drivebelt to a mode in which the tensioner non-compliantly tensions the drivebelt so as to prevent the tension from decreasing. In other words, controller 94 will issue a command to the strut as shown in FIG. 6, for example, to lock solenoid 64 between two of the adjacent teeth on rack 62. As a result, pulley 34 will be maintained in contact with drivebelt 12 even if the engine decelerates precipitously, because arm 20 will be prevented from rotating in a direction so as to decrease the tension in the belt. As a result, drivebelt 12 will be prevented from slipping.

FIG. 7 illustrates another embodiment of the present invention in which strut 24 comprises an electronically piloted sliding friction wedge plunger which operates as follows. In the event that controller 94 orders strut 24 to a locked position, solenoid 78 will be energized by controller 94, and plunger 76 will be pushed axially into engagement with one of brake shoes 74. Thereafter, brake shoes 74 will be partially engaged with the inside diameter of cylinder 38, and if the engine decelerates abruptly and arm 20 begins to push connecting rod 30 in a direction so as to reduce tension in the belt, wedge 72 will forcibly engage brake shoe 74 with the inside of cylinder 38 so as to lock tensioner 18 in an unyielding, non-compliant position, as previously discussed.

FIG. 9 illustrates another embodiment of a hydraulic strut according to the present invention, in which the tensioner is allowed to normally be compliant in both directions. This is achieved by allowing fluid flow to accompany movement of piston 36 in both directions in a relatively unrestricted fashion in a normal condition. Thus, fluid is allowed to flow through bypass channel 54 even when the piston is moving in an upward direction, but only if solenoid 60 is maintaining pintle 58 in its fully retracted position, as illustrated in FIG. 9. As shown in this figure, if controller 94 gives a signal to solenoid 60 to move pintle 58 onto seat 56, fluid flowing from cylinder 38, as the piston moves in the upward direction, will be caused to move through restrictive orifice 52, with the result that the hydrostatic lock condition previously described will be present and tensioner 18 will prevent belt 12 from moving to a condition of lesser tension. As before, solenoid 60 will be controlled so that motion of piston 36 will be restrained when the engine is operating in a mode of rapid engine acceleration or at higher engine speeds, or at other conditions known to those skilled in the art and suitable for application of the present invention.

Figure 5:
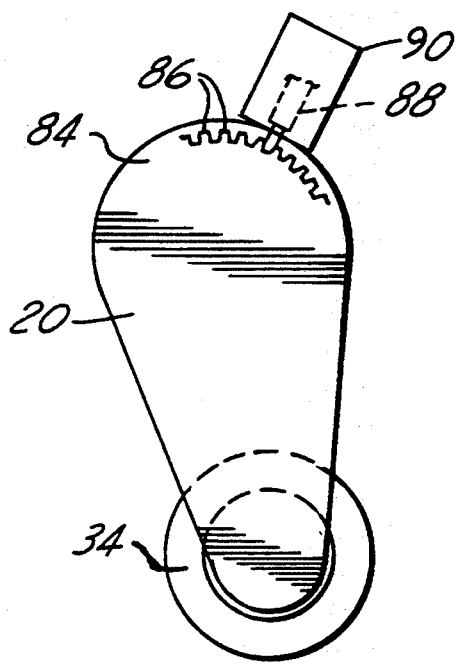
FIG. 5 is an illustration of another embodiment of the present invention in which a geared hub is lockable in a plurality of positions by an electronically controlled solenoid plunger.

FIG. 5 illustrates yet another embodiment of the present invention in which plunger 88 is selectively engageable with teeth 86 on hub 84 of tensioner arm 20 such that rotation of the arm is selectively restricted upon command by controller 94, which may be arranged to respond to the operating conditions described in connection with the earlier embodiments.

Those skilled in the art will appreciate that changes and modifications may be made to the invention described herein, while nevertheless coming under the scope of the following claims.

We claim:

1. An accessory drive system for an automotive engine, comprising:
   a drive pulley attached to an output shaft of the engine;
   a flexible drive belt for connecting the drive pulley with a plurality of driven pulleys, with one driven pulley located upon each of a plurality of driven devices; and
   a tensioner for maintaining the drive belt in contact with each of said drive and driven pulleys, with said tensioner comprising an arm which is rotatably mounted to the engine and which has a wheel for contacting the drive belt, with the wheel being urged into contact with the drive belt by the arm, and with said tensioner further comprising a governor for controlling the rotational motion of the arm such that the arm will be freely able to rotate in the direction in which the tension in the drive belt is increased, with said governor resisting motion of the arm in the direction in which tension in the drive belt is decreased, wherein said governor comprises a hydraulic strut interposed between said tensioner arm and a mounting surface fixed to the engine adjacent the tensioner, such that linear motion of the strut accompanies rotational motion of the arm, with the strut having a connecting rod portion being able to move freely in the direction in which tension in the drive belt is increased, while resisting movement in the direction in which tension in the drive belt is decreased.

2. An accessory drive system according to claim 1, wherein the hydraulic strut comprises a piston reciprocably mounted within a cylinder upon said connecting rod, with the connecting rod having a free end attached to the tensioner arm such that the piston slides within the cylinder as the tensioner arm rotates, with the motion of the piston being controlled by hydraulic fluid contained within the cylinder such that motion of the piston in the direction which allows the tensioner to rotate in the direction in which the tension in the drive belt is increased is substantially uninhibited, but motion of the piston in the direction in which the tensioner allows the tension within the drive belt to decrease is restrained by hydrostatic force within the cylinder.

3. An accessory drive system according to claim 2, wherein hydrostatic force is maintained within the cylinder by causing fluid leaving the cylinder under a compressive force generated by the piston to flow through a restrictive orifice when the piston is moving in the direction in which tension within the drive belt is decreased, with the strut having a parallel flow channel which is valved so as to allow fluid to flow freely from the cylinder when the piston is moving in the direction in which tension within the drive belt is increased.

4. An accessory drive system according to claim 1, wherein the hydraulic strut comprises a piston reciprocably mounted within a cylinder upon said connecting rod, with the connecting rod having a free end attached to the tensioner arm such that the piston slides within the cylinder as the tensioner arm rotates, with the motion of the piston being controlled by hydraulic fluid supplied to the cylinder such that motion of the piston in the direction so as to allow the tensioner to rotate in the direction in which the tension in the drive belt is increased is substantially uninhibited, but motion of the piston in the direction in which the tensioner allows the tension within the drive belt to decrease is selectively restrained by hydrostatic force within the cylinder.

5. An accessory drive system according to claim 4, wherein hydrostatic force is selectively maintained within the cylinder by causing fluid leaving the cylinder under the compressive force of the piston to flow through either a restrictive orifice or a bypass channel when the piston is moving in the direction in which the tension within the drive belt is decreased, with flow through the bypass channel being controlled by a solenoid valve operated by an electronic controller such that when the solenoid valve is open, motion of the piston will be unrestrained in both directions.

6. An accessory drive system according to claim 5, wherein said electronic controller operates said solenoid valve such that rotational motion of the arm is restricted during periods of operation characterized by rapid engine deceleration.

7. An accessory drive system according to claim 5, wherein said electronic controller operates said solenoid valve such that rotational motion of the arm is restricted when engine speed exceeds a predetermined value.

8. An accessory drive system according to claim 1, wherein said governor comprises an electronically lockable strut interposed between said tensioner arm and a mounting point adjacent the tensioner, such that linear motion of the strut accompanies rotational motion of the arm unless the strut is locked.

9. An accessory drive system according to claim 8, wherein said strut comprises a slidable, geared rack which is lockable in a plurality of linear positions by a solenoid actuated plunger engageable with the gear teeth of said rack, with said plunger being operated by an electronic controller.

10. An accessory drive system according to claim 9, wherein said electronic controller operates said plunger such that rotational motion of the arm is restricted during periods of operation characterized by rapid engine deceleration.

11. An accessory drive system according to claim 9, wherein said electronic controller operates said plunger such that rotational motion of the arm is restricted when engine speed exceeds a predetermined value.

12. An accessory drive system according to claim 1, wherein said governor comprises an electronically piloted sliding friction wedge plunger located within a strut interposed between said tensioner arm and a mounting point adjacent the tensioner, such that linear motion of the strut accompanies rotational motion of the arm unless the strut is locked.

13. An accessory drive system for an automotive engine, comprising:
    a drive pulley attached to an output shaft of the engine;
    a flexible drive belt for connecting the drive pulley with a plurality of driven pulleys, with one driven pulley located upon each of a plurality of driven devices;
    a tensioner for maintaining the drive belt in contact with each of said drive and driven pulleys, with said tensioner comprising an arm which is rotatably mounted to the engine and which has a wheel for contacting the drive belt, with the wheel being urged into contact with the drive belt by the arm, and with said tensioner further comprising a governor for controlling the rotational motion of the arm such that the arm will be freely able to rotate in the direction in which the tension in the drive belt is increased, with said governor selectively resisting motion of the arm in the direction in which tension in the drive belt is decreased; and
    an electronic controller for operating the governor in response to at least one sensed engine parameter, such that movement of the arm in the direction in which tension in the drive belt is decreased will effectively be prevented in the event that the value of the sensed parameter indicates that the engine is operating in a mode in which the tension would otherwise be decreased.

14. An accessory drive system according to claim 12, wherein said electronic controller operates said governor such that rotational motion of the arm is restricted during periods of operation characterized by rapid engine deceleration.

15. An accessory drive system according to claim 12, wherein said electronic controller operates said governor such that rotational motion of the arm is restricted when engine speed exceeds a predetermined value.

16. A method for controlling the tension of a flexible drive belt in an accessory drive system for an automotive engine, comprising the steps of:
    sensing at least one engine operating parameter indicative of engine operation in a mode tending to decrease tension in the drivebelt below a threshold at which traction of the belt is adequate to avoid slipping of the belt; and
    upon sensing a value of said at least one operating parameter corresponding to a value of drive belt tension below said threshold, directing a tensioner associated with said accessory drive system to change from a mode in which the tensioner compliantly tensions the drive belt to a mode in which the tensioner noncompliantly tensions the drive belt so as to prevent the tension from decreasing.

* * * * *